US008214295B2

(12) United States Patent
O'Donnell et al.

(10) Patent No.: US 8,214,295 B2
(45) Date of Patent: Jul. 3, 2012

(54) INTERNET SYSTEM FOR FACILITATING HUMAN USER ADVISEMENT AND LICENSING OF COPYRIGHTED WORKS OF AUTHORSHIP

(75) Inventors: Lawrence O'Donnell, Northport, FL (US); Michael O'Donnell, Sammamish, WA (US)

(73) Assignee: iCopyright, Inc., Seattle, WA (US)

( * ) Notice: Subject to any disclaimer, the term of this patent is extended or adjusted under 35 U.S.C. 154(b) by 163 days.

(21) Appl. No.: 12/895,677

(22) Filed: Sep. 30, 2010

(65) Prior Publication Data

US 2011/0023127 A1     Jan. 27, 2011

Related U.S. Application Data

(63) Continuation-in-part of application No. 11/026,993, filed on Dec. 29, 2004, now abandoned, which is a continuation-in-part of application No. 09/245,798, filed on Feb. 5, 1999.

(51) Int. Cl.
*G06F 21/00* (2006.01)
(52) U.S. Cl. ................ 705/51; 705/54; 705/59
(58) Field of Classification Search .............. 713/167; 705/27, 59, 64; 1/1; 380/277, 278, 201, 380/202; 707/781, 797, 798
See application file for complete search history.

(56) References Cited

U.S. PATENT DOCUMENTS

| | | | |
|---|---|---|---|
| 4,173,408 A | 11/1979 | Stewart | |
| 4,179,212 A | 12/1979 | Lahr | |
| 5,008,827 A | 4/1991 | Sansone et al. | |
| 5,193,056 A | 3/1993 | Boes | |
| 5,204,897 A | 4/1993 | Wyman | |
| 5,251,294 A | 10/1993 | Abelow | |
| 5,291,596 A | 3/1994 | Mita | |
| 5,299,026 A | 3/1994 | Vincett et al. | |
| 5,428,529 A | 6/1995 | Hartrick et al. | |
| 5,444,779 A | 8/1995 | Daniele | |
| 5,475,753 A | 12/1995 | Barbara et al. | |
| 5,490,216 A | 2/1996 | Richardson, III | |
| 5,530,520 A | 6/1996 | Clearwater | |

(Continued)

FOREIGN PATENT DOCUMENTS

EP      0 778 512 A2     6/1997
(Continued)

OTHER PUBLICATIONS

Reid, Calvin. "AAP Unveils DOI at PSP Confab: Publishers Interested but Wary." Publisher's Weekly. New York: Feb. 24, 1997. vol. 244, Iss. 8; p. 11.*

(Continued)

*Primary Examiner* — Calvin L Hewitt, II
*Assistant Examiner* — Mohammad A Nilforoush
(74) *Attorney, Agent, or Firm* — Timothy E Siegel Patent Law, PLLC; Timothy E Siegel

(57) ABSTRACT

An Internet system for disseminating information regarding works or authorship, including a server and a client device connected to the Internet and wherein when any one web page out of a set of web pages is displayed on the client device and when a work of authorship is displayed as part of the web page, an image is also displayed near the work of authorship, as part of the webpage and when a user clicks on the image, copyright information concerning the work of authorship is presented in a user-perceivable manner.

6 Claims, 9 Drawing Sheets

U.S. PATENT DOCUMENTS

| | | | |
|---|---|---|---|
| 5,553,143 | A | 9/1996 | Ross et al. |
| 5,629,980 | A | 5/1997 | Stefik et al. |
| 5,634,012 | A | 5/1997 | Stefik et al. |
| 5,712,914 | A | 1/1998 | Aucsmith et al. |
| 5,715,403 | A | 2/1998 | Stefik |
| 5,748,956 | A | 5/1998 | Lafer et al. |
| 5,758,068 | A | 5/1998 | Brandt et al. |
| 5,765,152 | A | 6/1998 | Erickson |
| 5,790,664 | A | 8/1998 | Coley et al. |
| 5,832,494 | A | 11/1998 | Egger et al. |
| 5,864,620 | A | 1/1999 | Pettitt |
| 5,875,296 | A | 2/1999 | Shi et al. |
| 5,991,876 | A | 11/1999 | Johnson et al. |
| 6,009,401 | A | 12/1999 | Horstmann |
| 6,073,124 | A | 6/2000 | Krishnan et al. |
| 6,088,731 | A | 7/2000 | Kiraly et al. |
| 6,112,181 | A | 8/2000 | Shear et al. |
| 6,119,108 | A | 9/2000 | Holmes et al. |
| 6,135,646 | A | 10/2000 | Kahn et al. |
| 6,138,237 | A | 10/2000 | Ruben et al. |
| 6,188,995 | B1 * | 2/2001 | Garst et al. .................. 705/59 |
| 6,209,036 | B1 | 3/2001 | Aldred et al. |
| 6,226,618 | B1 | 5/2001 | Downs et al. |
| 6,236,971 | B1 | 5/2001 | Stefik et al. |
| 6,324,645 | B1 | 11/2001 | Andrews et al. |
| 6,327,600 | B1 | 12/2001 | Satoh et al. |
| 6,339,767 | B1 * | 1/2002 | Rivette et al. ............... 707/781 |
| 6,385,596 | B1 * | 5/2002 | Wiser et al. .................. 705/51 |
| 6,389,403 | B1 | 5/2002 | Dorak, Jr. |
| 6,618,808 | B1 | 9/2003 | Johnson et al. |
| 6,625,581 | B1 | 9/2003 | Perkowski |
| 7,047,241 | B1 * | 5/2006 | Erickson ........................... 1/1 |
| 2004/0148503 | A1 | 7/2004 | Sidman |
| 2005/0044139 | A1 | 2/2005 | Christian et al. |
| 2005/0102240 | A1 * | 5/2005 | Misra et al. .................. 705/59 |
| 2005/0188318 | A1 | 8/2005 | Tamir et al. |

FOREIGN PATENT DOCUMENTS

| | | |
|---|---|---|
| EP | 0 809 244 A2 | 11/1997 |
| EP | 0 845 733 A2 | 6/1998 |
| WO | WO 92/20022 | 11/1992 |
| WO | WO 97/37316 | 10/1997 |
| WO | WO 97/43717 | 11/1997 |

OTHER PUBLICATIONS

Copyright Clearance Center, Inc.; Republican Licensing Service; www.copyright.com/services/rlscorporate.asp.

Stefik et al., "The bit and the pendulum", Computer Lawyer, Jan. 1999 [retrieved Mar. 31, 2004], vol. 16, Issue 1, 14 pages, retrieved from: Proquest Direct.

Hinds, Isabella, "Electronic Rights Management", www.copyright.com, Feb. 8, 1997 [retrieved Mar. 31, 2004], 3 pages, retrieved from: Google.com and archive.org.

Gervais, Daniel J., "ECMS in a network environment", www.copyright.com, Jul. 4, 1997 [retrieved Mar. 31, 2004], 9 pages, retrieved from: Google.com and archive.org.

Screenshots, www.copyright.com, Jan. 10, 1998 [retrieved Mar. 26, 2004], 37 pages, retrieved from: archive.org and Google.com.

"DOI System Specification", www.doi.org/system_spec.html, Mar. 31, 1997 [retrieved Nov. 8, 2004], pp. 1-5, retrieved from: Archive.org.

"Association of American Publishers proposes a digital object identifier (DOI) or electronic access to publications", Information Intelligence, Online Libraries, and Microcomputers, Oct. 1997 [retrieved Jul. 2, 2004], p. 1, retrieved from: Proquest Direct.

Reid, Calvin, "AAP unveils DOI at PSP Confab", Publishers Weekly, Feb. 24, 1997 [retrieved Jul. 2, 2004], vol. 244, Iss. 8, 2 pages, retrieved from: Proquest Direct.

Lichtenberg, James, "Metadata for the Millenium", Publisher's Weekly, Apr. 21, 1997 [retrieved Jul. 2, 2004], vol. 244, Iss. 16, 3 pages, retrieved from: Proquest Direct.

"The Digital Object Identifier (DOI) System", www.doi.org, Dec. 6, 1998 [retrieved Mar. 9, 2005], 16 pages, retrieved from: Google.com and Archive.org.

Reid, Calvin, "STM houses, CCC showcase latest DOI prototype via AAP", Publishers Weekly, Sep. 29, 1997 [retrieved Jul. 2, 2004], vol. 244, Iss. 40, 2 pages, retrieved from: Proquest Direct.

Berinstein, Paula, "DOI: A new identifier for Digital Content", Searcher, Jan. 1998 [retrieved Jul. 2, 2004], vol. 6, Iss. 1, 7 pages, retrieved from: Proquest Direct.

Jacobson, Robert L., "Internet Tools designed to block unauthorized uses of copyrighted works", The Chronicle of Higher Education, Mar. 22, 1996 [retrieved Jul. 2, 2004], vol. 42, Iss. 28, 2 pages, retrieved from: Proquest Direct.

"Design Intelligence", Business Wire, Nov. 18, 1997 [retrieved Jul. 1, 2004], 2 pages, retrieved from: Dialog, file 810.

Elsevier Science, www.elsevier.com, Jan. 17, 1999 [retrieved Dec. 6, 2006], pp. 1-4, retrieved from: Google.com and archive.org.

Screenshots, www.cla.co.uk, Jan. 12, 1998 [retrieved Apr. 1, 2004], 16 pages, retrieved from: Google.com and archive.org.

Paskin, Norman, "The Digital Object Identifier Initiative: current position and view forward", International DOI Foundation, Aug. 14, 1998; Version 3.

Bradbury, Danny, "IT Management: Politics & Law", ComputerWeekly.com, Oct. 17, 2000, 3 pages.

Rosenblatt et al., "Integrating Content Management with Digital Rights Management—Imperatives and Opportunities for Digital Content Lifecycles", GiantSteps Media Technology Strategies, May 14, 2003, 21 pages.

Alrashid et al., "Safeguarding Copyrighted Contents—Digital Libraries and Intellectual Property Management", Apr. 1998, 8 pages.

Download It Now—XrML Version 2.0, ContentGuard Holdings, Inc., 2001-2002, 26 pages.

O'Donnell et al., "User Software for Facilitating Copyright Licensing and Compliance", Information Disclosure Statement, U.S. Appl. No. 10/867,831, Data Depth Corp., 2004, 7 pages.

Rust, Godfrey, "Metadata: The Right Approach, An Integrated Model for Descriptive and Rights Metadata in E-commerce", www.dlib.org/dlib/july98/rust/07rust.html, Jul. 1998, 27 pages.

* cited by examiner

# INTERNET SYSTEM FOR FACILITATING HUMAN USER ADVISEMENT AND LICENSING OF COPYRIGHTED WORKS OF AUTHORSHIP

RELATION TO PREVIOUS APPLICATION

This application is a continuation-in-part of application Ser. No. 11/026,993, filed Dec. 29, 2004 now abandoned, which is a continuation-in-part of application Ser. No. 09/245,798 filed on Feb. 5, 1999.

BACKGROUND OF THE INVENTION

This invention addresses the problem of how to obtain licensing permission to use material created by another, how to present assurances that permission was obtained for the use, and to track the entities entitled to a share of license fee payments.

All forms of human expression that can be recorded in a tangible medium are protected by copyright as "works of authorship". The possible media of expression include text, two-dimensional static visual images, moving visual images, three-dimensional sculptures, music recorded with visual graphics, music recorded in digital pitch specifications, music recorded as soundwaves, and soundwave recordings of spoken words. This list is not exhaustive as new forms are continually being invented.

When a party who does not own the copyrights in a work of authorship wishes to make a use of that work of authorship, a license is generally required. The owners of the copyrights generally are willing to allow their works to be used in exchange for a fee. Copyright clearinghouses have been established for various kinds of works of authorship so that standing offers of licenses from the owners of copyrights can be assembled in one place from which they can easily be retrieved and accepted. Typically, the clearinghouses also process and enforce the payment of fees by those who accept the offered licenses and distribute the fees to those who are entitled to them. Using labor intensive methods, the clearinghouses generally track all of this information on paper and computer databases and handle communications with owners of copyrights, with their distribution agents, and with licensees in person, by telephone, by fax, and by e-mail.

The Internet has presented serious challenges to the established copyright clearance systems. Many forms of works of authorship are now published digitally on the Internet, including text, audiowave recordings, digital music specifications, still images, and videos. When these works of authorship are received by a client computer on the Internet, a copy can very easily be made on the client computer. The copy can then be reproduced, distributed, performed, displayed, or used to prepare a derivative work. Although it is very easy to make such uses of source works of authorship, it is very difficult to find the owners of copyrights in these works or their agents and obtain licenses. Furthermore, even if the source work of authorship is used with permission, it is difficult for a person viewing the reproduced work, including the owner of copyrights in the source, to verify that the source was, in fact, used with permission without exceeding the scope of the license.

Inventors have attempted to solve this problem by presenting technical means to prevent or discourage unauthorized use of works of authorship. These methods include using public key encryption to verify certificates of authority which are attached to works of authorship to prove that licenses have been obtained. They also include various methods of applying watermarks to a digital work of authorship to trace the reuse of a work.

SUMMARY OF THE INVENTION

Rather than presenting technical barriers to unauthorized use or providing means to discover or prove unauthorized use, this invention makes it much easier to obtain licenses (or "clearances") to use source material and to verify that the material has been used within the scope of the license. While some users will pirate materials given the opportunity, the vast majority will obtain a proper license if it can be done quickly and easily and they can easily prove to others that they obtained the proper license.

In one aspect, the invention is a method for offering to recipients of published works of authorship a license to use the work of authorship. When a person uses a client computer (which may be in the form of WebTV, DVD player, electronic book viewer, PDA, etc.) connected to a computer network, generally the Internet, to receive a work of authorship from a server, the work of authorship is tagged with a unique identifier. This unique identifier can be used as part of a network address to direct the client computer's web browser to a licensing web page for that work of authorship. At the licensing web page, the terms of one or more alternative licenses are presented to the user. By providing information identifying the user and indicating acceptance of the offered license, the user can receive the desired license. To make this process easy for the user, the unique work identifier is transmitted along with the work of authorship in machine readable form so that it can be automatically read by the user's web browser and can automatically direct the web browser to the licensing web page. This is preferably accomplished by incorporating a "hot spot" into a viewable image that is transmitted to the user along with the work of authorship so that if the user selects the hot spot, the user's web browser automatically retrieves and displays the licensing web page.

In another aspect, the invention is a method for granting licenses to use a work of authorship and publishing records of licenses granted. When the user retrieves the licensing web page and reviews the offered license, the licensing transaction can be consummated without human interaction on the part of the licensor or a human agent for the licensor. By transmitting from the user's client computer to the server of the web page digital information signifying acceptance of the offered license, the license transaction is completed. The server of the licensing web page then automatically creates a license record associated with the license that has been granted. The license record is given a unique license identifier which can be used to find the license record on the network. The unique license identifier is then transmitted to the licensee for presentation with each licensed use of the source work of authorship. When the licensee publishes or otherwise uses the source material, the licensee presents the unique license identifier so that each recipient of the material can use the unique license identifier to access on the network the license record and determine the scope of the license that was granted.

In another aspect, the invention is a method for presenting recipients of works of authorship which are based on other source works of authorship with information regarding a license to use the source work of authorship. In this embodiment, the original source work of authorship need not be available on the network. The work which is based on the source is provided via the network and the unique license identifier is presented with it. Associated with the license identifier is a hot spot in a displayed image. The user can select the hot spot causing the user's web browser to automatically access a license record stored on the network which contains relevant information about the licensing transaction which granted the license.

To build the network accessible databases for the invention, the owners of copyright protected works of authorship ("content") register their works in a database accessible via the network called an "iCopyright" (Internet Copyright) database. Each registered work is given a unique work identifier or "tag" which is referred to as a "PRC" (Publisher's Registered Content). The PRC is expressed in machine readable form in digital copies of the work and is expressed in human readable form on all other copies. When a person receives a work of authorship not in digital form, the human readable PRC tag can be used to manually find licensing offers for that work within the database.

When a work is registered and assigned a PRC (unique work identifier), the offered license terms are entered into the database as a set of "business rules" for the content identified by the PRC. By following these business rules, other parties may accept offers of licenses stated by the rules. Each time an offer of license is accepted, a license data record is established for that license in a database. Each data record is identified with a unique license identifier which is referred to as an iCopyright Clearance License ("ICL"). For each PRC there may be many ICLs.

When the licensee publishes or otherwise uses the source content, the licensee places an ICL tag on the licensee's material. Like the PRC tag, the ICL tag is embedded in both machine readable form and human readable form. Selecting a hotspot associated with the machine readable tag will direct a user's web browser to the license data record where the license information can be verified. The human readable ICL tag can be used to manually find the license data record by typing it into a browser.

If the licensee under an ICL prepares a derivative work, this derivative work may also be registered in the database and given a PRC (unique work identifier). The derivative work will be published with both its own new PRC and an ICL identifying a record showing permissions granted by the owners of one or more copyrights in source works from which it was derived. The new PRC will point to an associated set of business rules which can result in further ICLs from the derivative work.

BRIEF DESCRIPTION OF THE DRAWINGS

The features of the present invention which are believed to be novel are set forth with particularity in the appended claims. Aspects of the invention, together with further objects and advantages thereof, may best be understood by making reference to the following description taken in conjunction with the accompanying drawings wherein:

DETAILED DESCRIPTION

In the following detailed description of exemplary embodiments of the invention, reference is made to the accompanying drawings. The detailed description and the drawings illustrate specific exemplary embodiments by which the invention may be practiced. Other embodiments may be utilized, and other changes may be made, without departing from the spirit or scope of the present invention. The following detailed description is therefore not to be taken in a limiting sense, and the scope of the present invention is defined by the stated claims.

Figure 9:
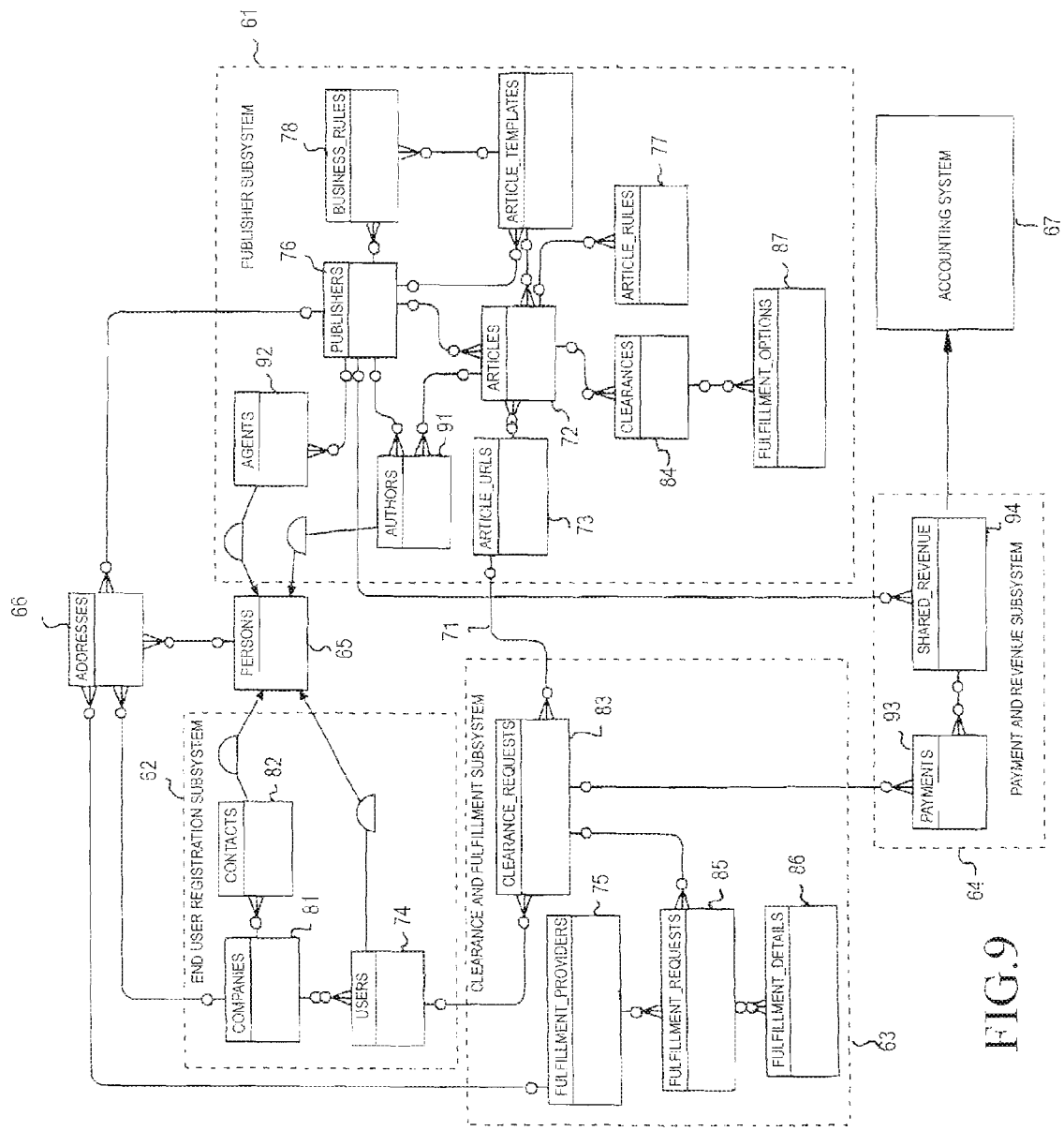
FIG. 9 is an entity relationship diagram for the database.

The invention is implemented with databases and web pages accessible via the Internet or any company's internal network. FIG. 9 is an entity relationship diagram for the database. In this diagram, each work of authorship is referred to as an "article." Major subgroups within the database design include the publisher subsystem 61, the end user registration subsystem 62, the clearance and fulfillment subsystem 63 and the payment and revenue subsystem 64. The publisher subsystem 61 and the end user registration subsystem 62 are further supported by a persons file 65 and an addresses file 66 which also further supports the clearance and fulfillment subsystem 63. The revenue subsystem 64 provides data to a separate accounting system 67.

When a user seeks clearance of a license to use a source work of authorship (an "article") the system also provides a service to the user by providing the article either in preferred electronic format or professionally printed and mailed. Consequently, there is a link 71 between the publisher subsystem 61 and the clearance and fulfillment subsystem 63. The link allows articles from an articles file 72 or from the network accessed via a URL from an articles URL file 73 to be communicated to the clearance and fulfillment subsystem for transmission to a user as identified in a user file 74 or for transmission to a fulfillment provider as identified in a fulfillment providers file 75.

Publishers, identified in the publisher's file 76, can upload articles to the articles file 72, or article URLs to the article URLs file 73, along with article rules stored in an article rules file 77 and business rules for the licensing of each article stored in a business rules file 78.

Clearances may be sought by companies, which are identified in a companies file 81, as known via their contacts stored in the contacts file 82, or by users identified without companies stored in a users file 74. Their requests for clearances are stored in the clearance request file 83 and the granted clearances are stored in a clearances file 84. Similarly, fulfillments requested by users or companies are stored in a fulfillment request file 85 with details in a subfile 86. The fulfillment options which may be allowed for each granted clearance are stored in the fulfillment options file 87.

Each publisher will typically service many authors and the author identities are stored in an authors file 91. The authors or publishers often work through agents which are stored in an agents file 92.

When clearances are requested, the company or user will authorize a payment which is stored in the payments file 93. Some of the revenue from the payments is allocated to publishers and stored in a shared revenue file 94. The publishers may request that a portion of the payments to which they are entitled be directed to the one of their distributors that distributed the source article.

Figure 1:
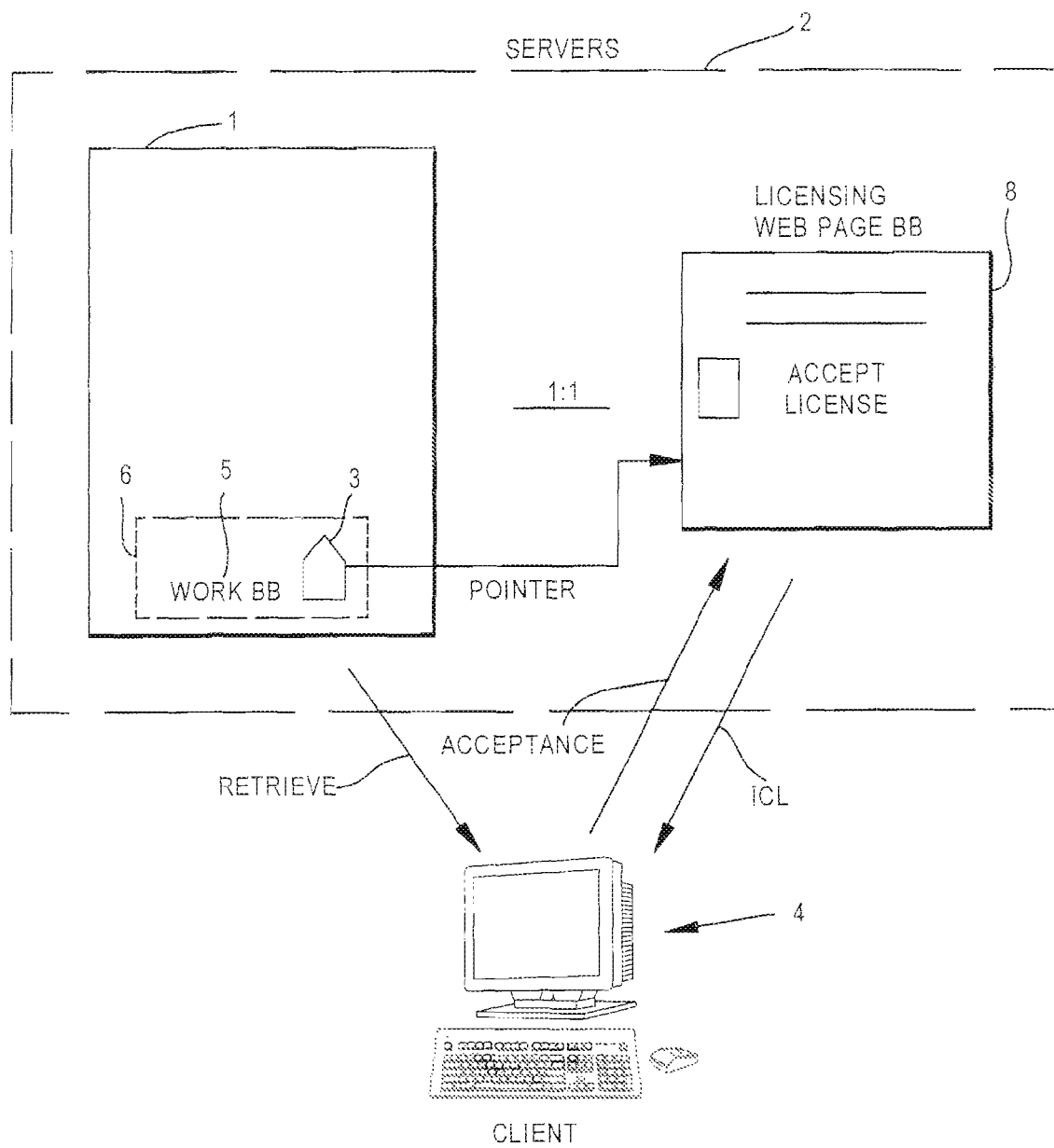
FIG. 1 shows how a user at a client computer that receives from a server a work of authorship can select a hot spot which takes the client to a licensing web page for the work.

The database shown in FIG. 9 is made available across the computer network through a user interface which controls the entire behavior of the system as perceived by parties accessing the system from client computers. As shown in FIG. 1, a member of the publisher's audience will retrieve a work of authorship which is provided by a server 2 to a client computer 4 via the network. Each work of authorship is presented with a visual image 1 at the client computer 4. The visual image includes an icon 3 which is intended to create an association in the mind of the viewer with the invented system. Associated with the icon 3 is a unique work identifier 5. The unique work identifier 5 can be entered at a keyboard of a computer on the Internet to access the licensing web page 8 for the work in question. The unique work identifier 5 is also encoded into the digital form of the visual representation 1 so that it can be used by a web browser to automatically refer ("point") to the licensing web page 8. A hot spot 6 is defined to include the icon 3 and the work identifier 5. If the user clicks on this hot spot 6, the work identifier is used as part of a network address and the users' web browser is directed to the licensing web page via the machine-readable copy of the work identifier 5. The PRC tag may be thought of as consisting of either the icon 3, or the work identifier 5, or both of them together, or the entire hot spot 6 which surrounds them.

While connected to the licensing web page 8, the user may cause the client computer to transmit to the licensing web page an acceptance signal indicating that the offered license is accepted. The server which runs the licensing web page 8 then transmits to the client, in digital format ready for use in a document created by the user, an ICL which is evidence that the license has been granted.

Figure 2:
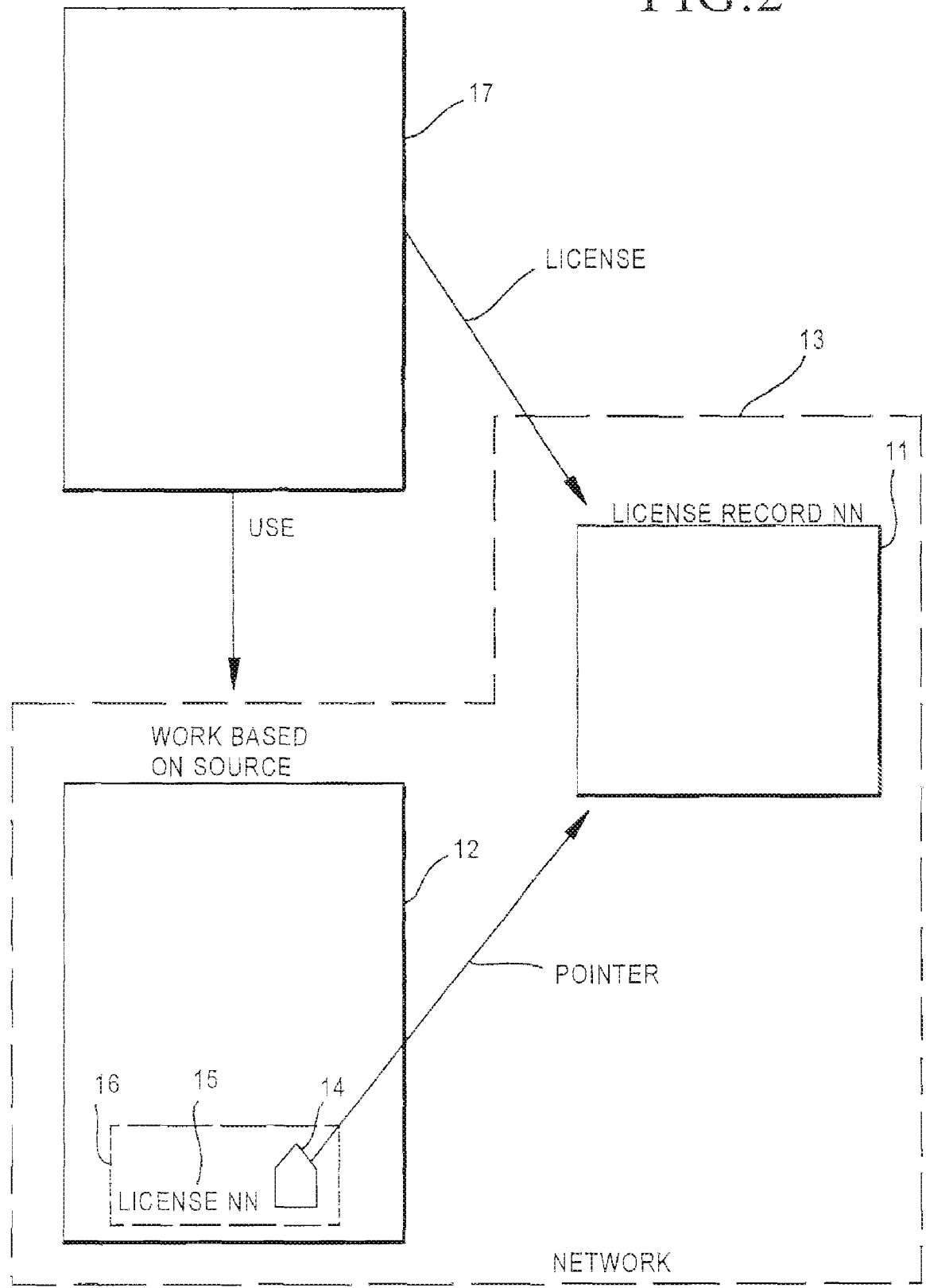
FIG. 2 shows how a user at a client computer that receives from a server a work based on an original source can select a hot spot which takes the client computer to a license record for the license to prepare the work.

As shown in FIG. 2, a license record 11 may be created in a database for any licensed work which is made available on the same network 13 as the database containing the license record 11. The licensed work may be based on any source. It may be in any form. It is accompanied by a visual representation 12 which is displayed at a client computer when the work is accessed from the client computer. The visual representation 12 includes a license icon 14 and a license identifier 15. The license identifier can be entered at the keyboard of a computer on the network 13 to access the license record 11. The license icon 14 and the license identifier 15 are surrounded by a hotspot 16. A machine-readable copy of the license identifier 15 is incorporated into the digital representation of the visual representation 12 such that when the user clicks on the hotspot 16, the license identifier is used as part of a network address and the user's web browser is directed to the license record 11. In this aspect of the invention, the source work 17 need not be available on the Internet or any other computer network. The ICL may be thought of as the icon 14, or the license identifier 15, or both, or the hot spot 16 which surrounds them.

Figure 3:
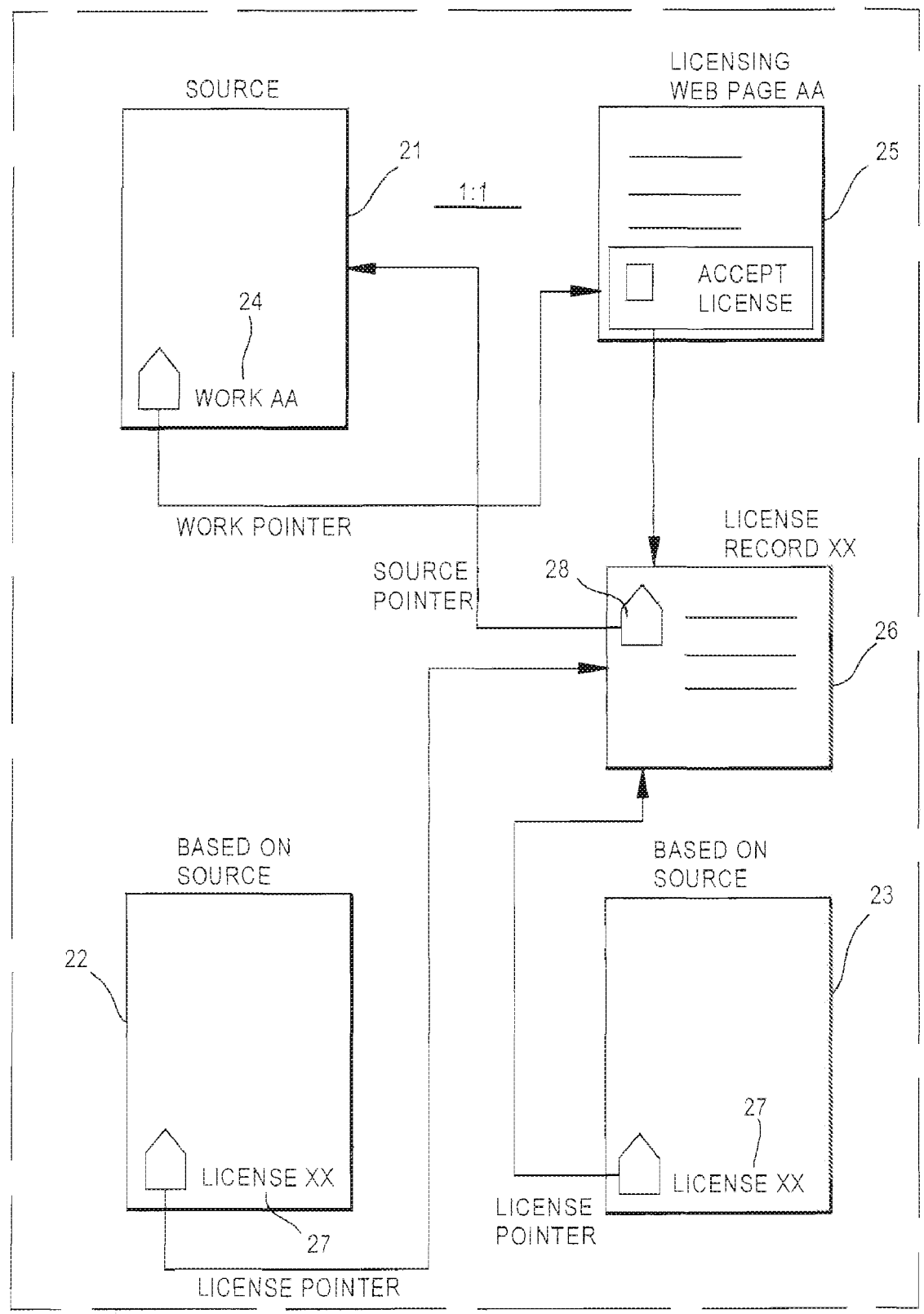
FIG. 3 shows the relationships within the network between a published source work with a hotspot, which points to a licensing web page from which a licensee creates a license record, which produces a license identifier, which is incorporated into works based on the source and points back to the license record.

FIG. 3 shows the complete system where both source works of authorship 21 and licensed works of authorship 22 and 23 are made available on the Internet or other network. The source content 21 includes a PRC 24 which points to a licensing web page 25. There is a one-to-one relationship between each source item and each licensing web page. The contents displayed at the licensing web page are managed by the user interface and the database system shown in FIG. 9. The business rules from the business rules file 78 of the database system control the options that are presented to each client who accesses the web page. If the person at a client computer wishes to accept one of the offered licenses, the client computer transmits a signal to the database system which indicates acceptance. This process triggers the creation of a license record 26 for that license transaction. The license record is stored in the clearances file 84 of the database. When the license record is created, the database system also transmits to the user an ICL 27 complete with an icon and a license identifier for the user to incorporate in any work of authorship prepared by the user which is based on the source 21. As shown in FIG. 3, many works of authorship 22 and 23 which are based on the source can be created under a single license. They will all incorporate the same ICL 27. The ICL 27 in each work which is based on the source 22 and 23 will point to the single license record 26. The license record 26 also has a source icon 28 which is a link that points to the URL for the source 21. This allows anyone who finds the license record to also find the source and, by following the PRC 24 at the source, find the licensing page 25 for the source.

Source items which are mirrored on the web all have the same PRC, all of which point to the same licensing page. The database behind the licensing page maintains a list of all the mirrored locations. It learns their locations either by explicit entry or via a web spider that automatically searches the web for mirrored copies and adds their locations to the database so when a user wants to read or download a copy, they can chose from a set of mirrored copies that which is the "closest" or "easiest" for them to access.

Figure 4:
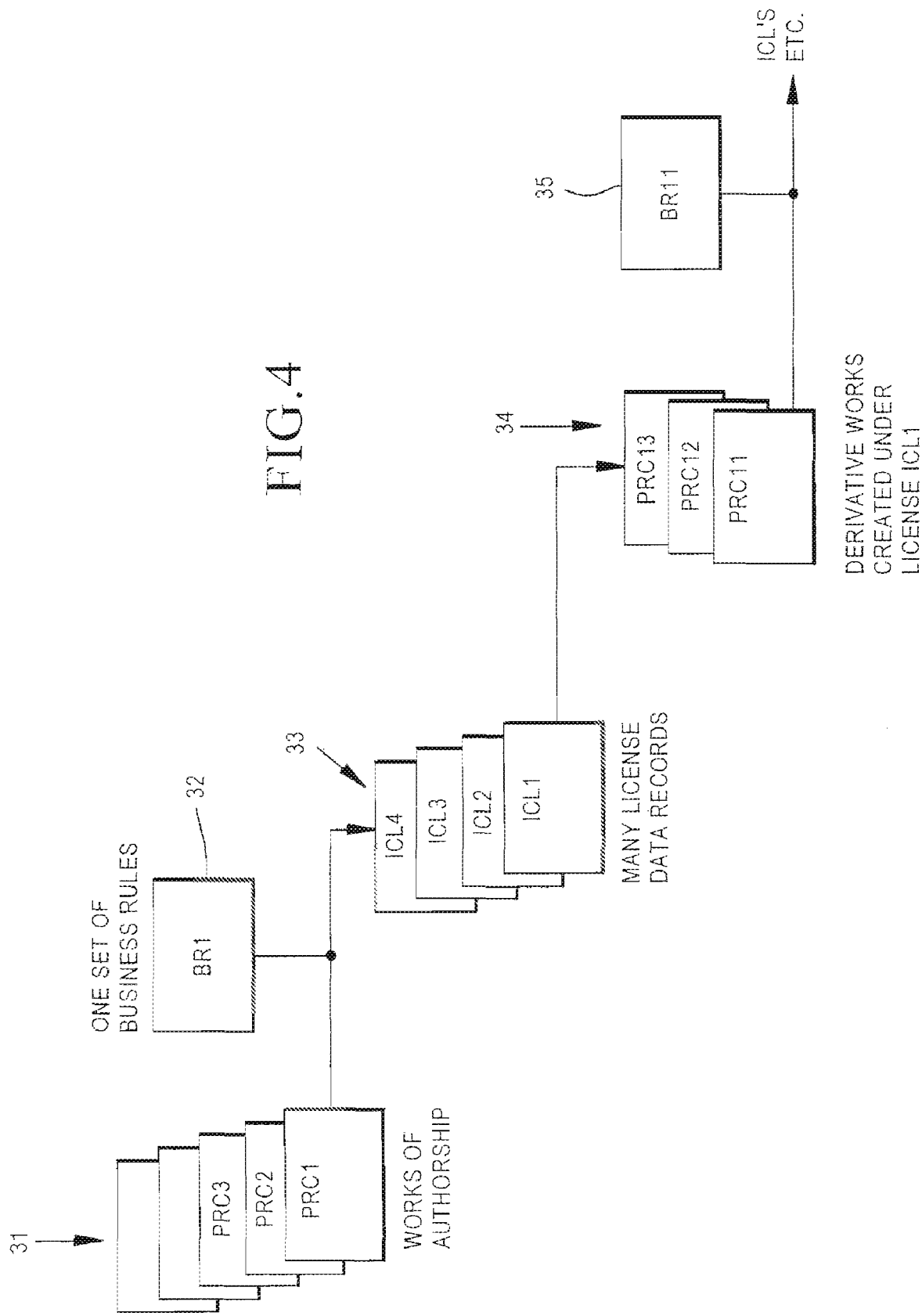
FIG. 4 shows a database of PRCs with one set of business rules for each PRC and many ICLs for each PRC and that each ICL can result in many more PRCs.

The relationships between the essential items which are stored in the database are shown in FIG. 4. For each work of authorship there is a PRC 31. For each PRC there is one set of business rules 32. The rules can change over time, and all changes are recorded by the database. Once licenses have been accepted based on the business rules, there will be one or more license data records 33, each identified by an ICL, for each PRC. If one of the licensees under an ICL creates a derivative work based on the source, the derivative work may itself be registered as a PRC 34. The entries in the database for the derivative works 34 are the same as to the entries in the database for the source works of authorship 31. They are as shown as separate groups in FIG. 4 merely for clarity. As stated above, each derivative work PRC 34 has one set of business rules 35. As shown in FIG. 4, the process has now become circular as derivatives of derivatives may be created.

Each publisher or author can, at any time, check the database to obtain information on the licenses which have been granted.

The unique work identifiers or PRCs may each be thought of as a universal resource name ("URN") as that term is used to refer to the basic structure of the Internet. A PRC is made up of a series of fields, each separated by a "." (dot). Moving left-to-right, each field provides successively increasing identification precision. A PRC has the following basic format:

AA.BBBB.CCCC[.DDDD]

where:

AA=the PRC series identifier, which determines how the rest of the fields are to be interpreted.

BBBB, CCCC and DDDD=subsequent fields, who's interpretation depend on the interpretation of each of the fields to the left.

BBBB identifies the publisher. CCCC is a sub-identifier identifying anything the publisher wishes, such as which distributor was used for the content, such as Yahoo or CNN or a newspaper, so web page access information can be tracked and the publisher and distributor can be informed and the distributor can be given credit when the content is licensed. The interpretation of DDDD, which typically identifies the content, is controlled by the interpretation of BBBB (the publisher) and may be controlled by the interpretation of CCCC.

For example, for series 01 PRCs, there are four fields. They have the following meanings:

01.BBBB.CCCC.DDDD where:

01=PRC series 01

BBBB=Publisher's id

CCCC=Identifies distributor (assigned by, or on behalf of, Publisher BBBB)

DDDD=Content Part Number (assigned by, or on behalf of, Publisher BBBB)

An ICL has one (or more) fields added to the right of a PRC, to specify the content user and content use that is registered for a particular PRC. For example, the ICL 01.2196.5773.9876.1234 is interpreted as follows:

01=PRC series 01

2196=Publisher ID, viz. iCopyright, Inc.

5773=Content Part Number, viz. the article "What's in a name?", written by Mike O'Donnell.

9876=Distributed by America On Line (AOL)

1234=Right to Use id, indicating that Andrew Cameron has the right to print 20 copies of this article on a local printer.

PRCs are uniquely assigned whenever documents are registered via the web-browser based interface or when bulk registration or workflow registration protocols are used. ICLs are derived from PRCs, and are uniquely assigned whenever a user commits to a particular clearance type for a particular piece of content. Additional clearances for the same content, even by the same user, usually result in a new and unique ICL being assigned. This obviously occurs when requesting a different type of clearance for a particular piece of content, but may also apply when additional quantities are requested for the same type of clearance against the same piece of content.

For example, a user requests 200 high-quality reprints of an article, and then, two weeks later, wishes to order 200 more. Depending on whether the same print provider is used, and whether the publisher's business rules for that piece of content have changed, two things can happen. If nothing has changed, the original license identified by the ICL can be upgraded to 400 licensed copies. If anything changes in the order, a unique ICL for that use is issued.

A new PRC is only issued when the content it identifies changes so as to mean that a new and distinct piece of content has been created. If the same piece of content is submitted for registration more than once, the same PRC is generated each time.

Figure 5:
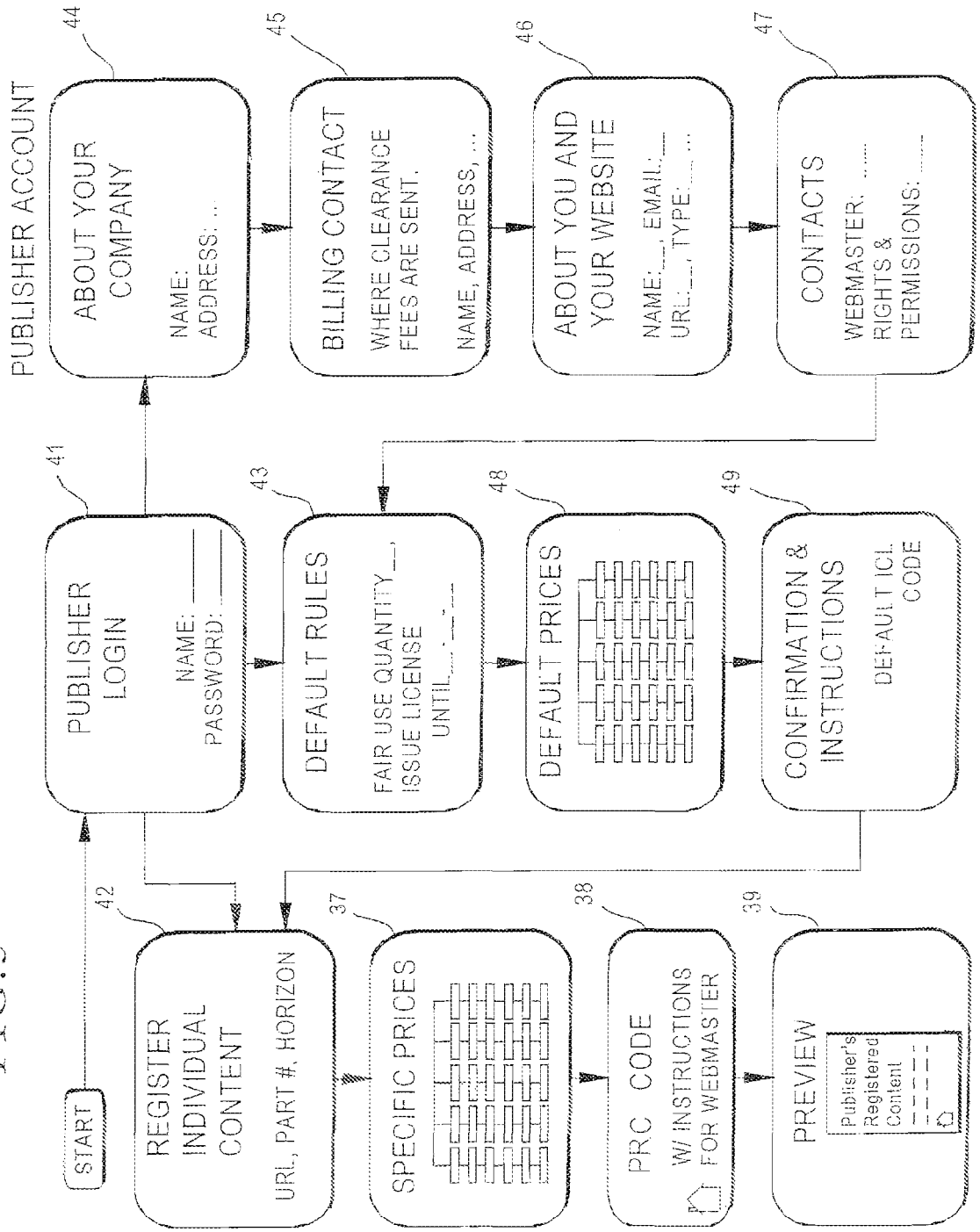
FIG. 5 shows the process by which a publisher can register each content item in the database.

FIG. 5 shows the process by which a publisher registers content items. At step 41, the publisher enters a name and password. From here, the publisher can go to any of steps 42, 43, or 44. The publisher enters information about the company at step 44, information about the billing contact at step 45, information about the person registering the content at step 46 and information about other contacts for the publisher at step 47. The publisher then enters the default business rules at step 43 and the default prices at step 48. The publisher is then given a confirmation and an opportunity to provide additional instructions. The system then provides to the publisher the default PRC base code for that publisher. The publisher or distributor can extend this base code with a field that identifies each of the publisher's distributors or anything else that the publisher wishes. After registering the individual content items at step 42, the publisher enters specific prices for that content at step 37. Dates can be attached to prices so clearance at a certain price can be available one day and not the next. Functions can be attached to the prices, to have them change over time. "Aging" or "decaying" the prices correlates to the fact that yesterday's news is not worth as much as today's news. The publisher receives base PRC codes for each content item from which the final PRC codes are generated at step 38. At step 39, the publisher can view the licensing web page that will be presented to the public.

Figure 6:
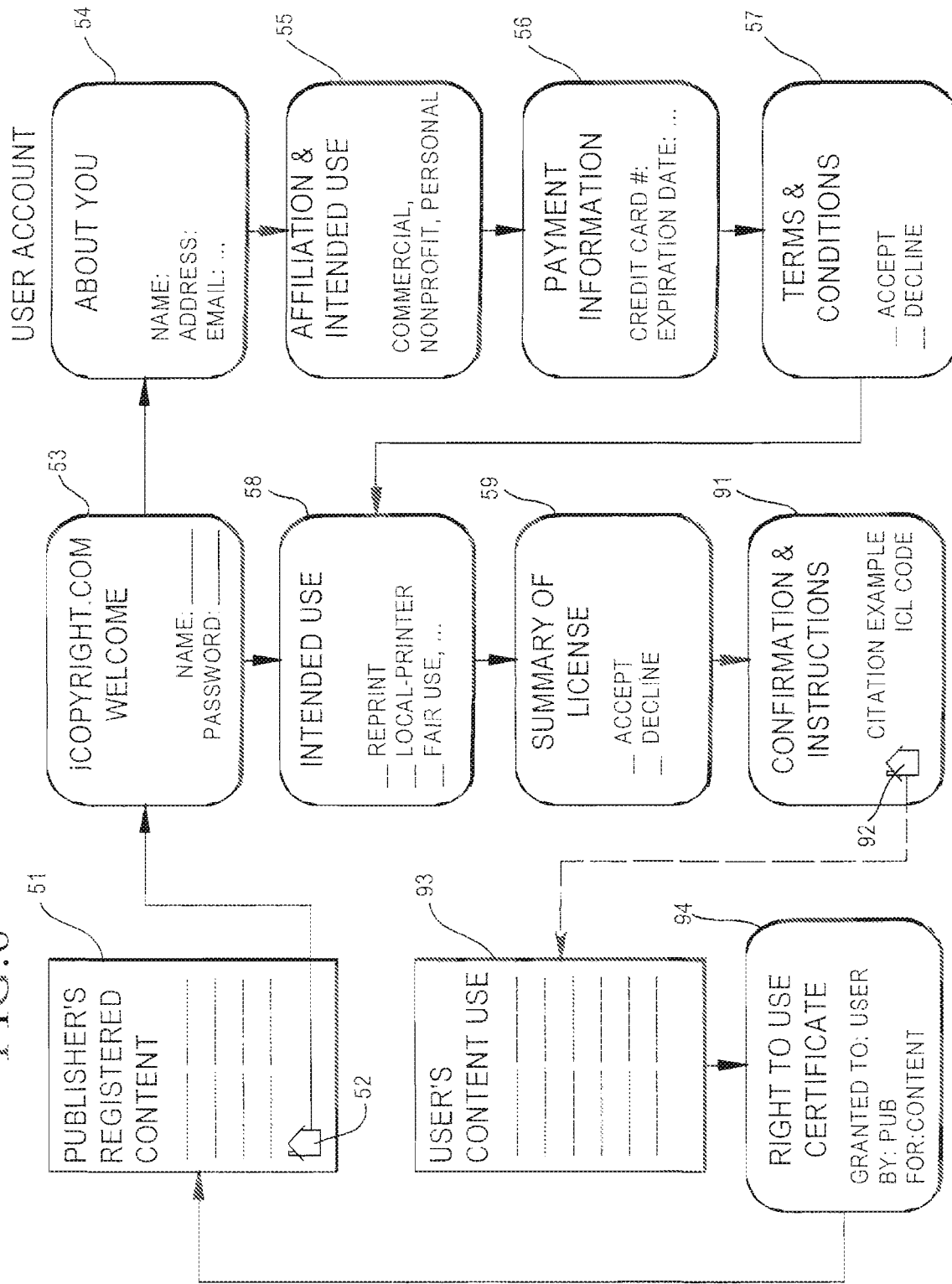
FIG. 6 shows the process by which a user can follow the PRC tag from published content through the process of obtaining a license and an ICL tag which is placed in the user's content.

FIG. 6 shows the process followed by a user. When a user views on the Internet an item of content which is registered with the system 51, the user can click on a PRC tag 52 which directs the user's web browser to a page of the iCopyright website which is customized for that publisher and that content. At the website, the user enters a name and password at step 53. From here, the user can go to step 54 or directly to step 58. The user enters information about himself, step 54, his affiliation and intended use, step 55, and his payment information, step 56. The user then accepts or declines the terms and conditions at step 57, and proceeds to state his intended use at step 58. The user then views the license or a summary of the license, step 59, and accepts or declines the license. If the license is accepted, the user proceeds to step 91 and receives confirmation and specifies any special instructions that are required to fulfill the user's request. In the case of Professional Reprints or other specialized document fulfillment requests, the user fills out forms that collect the required job and document transmittal information. This could also include the use of special (publisher required or user requested) document packaging, encryption, digital watermarking or transmission techniques.

Upon successful completion (including payment authorization) an example citation and the ICL code for the license are provided. When the ICL icon 92 is embedded in a document, a user on the Internet who clicks on the icon is directed to a license record 93 which presents the particulars of the license granted to the user. Within this license record, any person who has the ICL code can view particulars for the work that was published with the ICL code in step 94. The license record further includes an Internet URL which acts as a pointer back to the original source content 51 on which the work is based.

Figure 7:
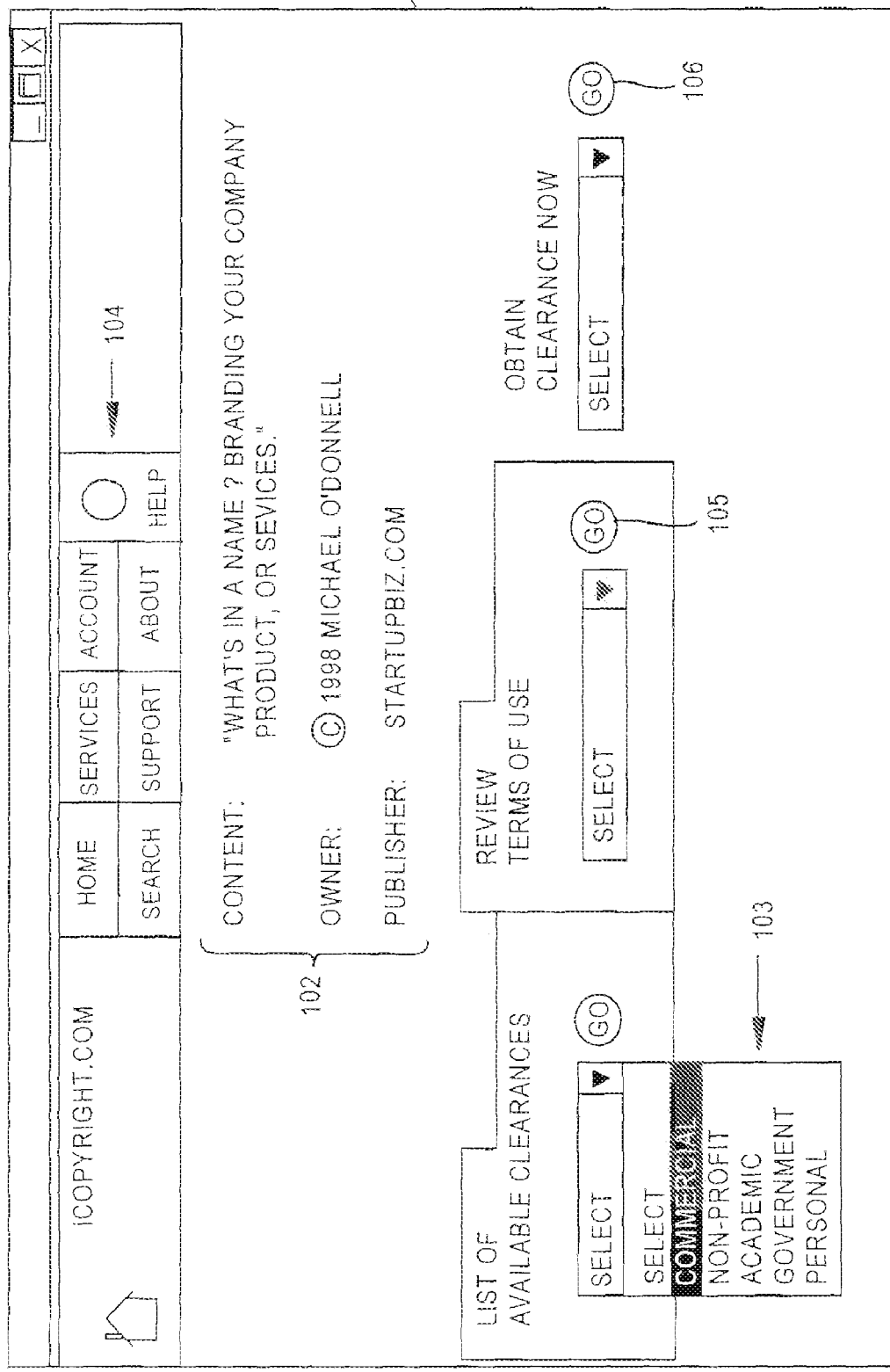
FIG. 7 shows the display screen of a licensing website and the categories of available license.

When a user clicks on a PRC associated with a work of authorship, a child browser window 101, which occupies less than the entire screen, appears superimposed on top of the work of authorship as shown in FIG. 7. The child browser 101 includes a toolbar 104 for accessing related features of the system. In a primary information field 102 the window presents the title of the content, the owner of copyrights in the content and the publisher. Each of these three items can be a link to an appropriate web page. From this child browser window, the user can view a list of available clearances 103. The user can also review the terms to which the user must agree for the license to be granted by clicking on a go button 105. Another go button 106 allows the user to login in so they can obtain a clearance.

Figure 8:
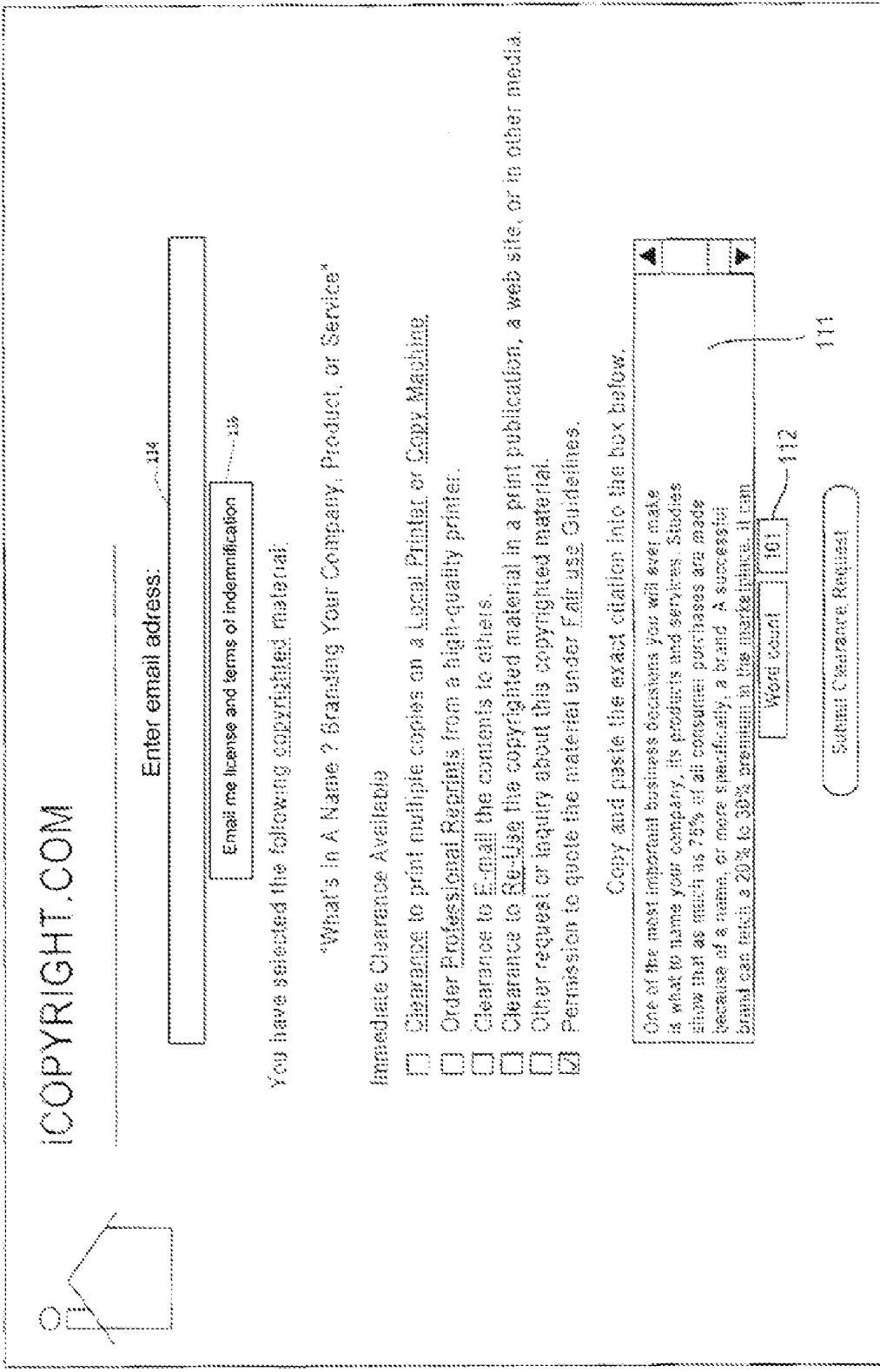
FIG. 8 shows specific licenses available at the licensing website within a category.

After the user selects a category of clearances from the list 103, the user is presented with a screen such as shown in FIG. 8. From this screen, the user selects a specific license or clearance. For short quotations, many publishers allow passages shorter than a certain number of words to be used without a fee. These can be accommodated as shown in FIG.

8 by allowing the user to paste the desired passage into a window 111. The system then counts the number of words pasted into the window and presents the count in a word count window 112. The system then informs the user whether the authorized word count has been exceeded.

A user accessing webpages displaying works of authorship from a computer located at the user's employer's place of business, may have a concern that if he licenses a work over the Internet, he may nevertheless inadvertently expose his employer to an undesired expense or liability or both. Accordingly in a preferred embodiment the licensing web page 8 includes a User Email Data Entry Window 114 and a Send Email Button 116, permitting a user to enter his Email and click the button, which results in an Email being sent to the user, stating the license terms. In a preferred embodiment the Email further states that if the user accepts the license terms he will be indemnified from any claim of copyright infringement. This Email can be forwarded or printed out and manually delivered to higher decision maker at the user's employer, to help the user gain authorization from his employer.

In addition to entering the database system from a PRC or an ICL, a user can enter the database through a website which allows searches of the database. The database can be searched by copyright owner's name, author's name, content title, content URL, content PRC number, an ICL number, or any other attribute which will lead both to information on the source work of authorship and on any work of authorship based on the source which has also been registered. The system will display to the user a summary of the licensing policies of any publisher for any content, as well as a link to a page on the publisher's website where the full information can be found.

The information in the database about each publisher is most complete for publishers who have voluntarily registered. However, the database is also loaded with data on other publishers who have not chosen to register by collecting such information which they publish. Users cannot automatically obtain licenses for works published by publishers who have not registered, but they can get assistance from the system in contacting the publisher directly to obtain a license. The system collects the necessary information from the user for a request for a license and automatically forwards the request to the appropriate permissions manager for the publisher, thereby acting as an automated agent for the user.

When the user enters the system to obtain a clearance, the user is given an opportunity to see a list of similar material also available for clearance through the system. This similar content list is created from the keywords and category tags that were attached to the content when it, and it's business rules, were registered.

Although the present invention has been described in considerable detail with reference to certain preferred embodiments, other embodiments are possible. Therefore, the spirit or scope of the appended claims should not be limited to the description of the embodiments contained herein. It is intended that the invention resides in the claims hereinafter appended. In the context of this application, the term "clicked on" refers to any user selection of a button, whether by use of a mouse or keyboard, and whether on a desktop computer or a mobile device. A button is the same as a hotspot, an area of the screen that when clicked on produces some result, such as for example, shifting display to another webpage, a link for which may be associated to the button. It is not the intent in this application to limit the term "image" as it is occasionally used in webpage design, as something that is distinguished from text, but rather an image is whatever can be visually perceived, so that the term encompasses a block of text.

The invention claimed is:

1. An internet-enabled server for enabling peer-policing for copyright compliance and enforcement, the server having a processor and a memory, and being connected to a first client device that is displaying a first work of authorship, the memory storing instructions that when executed by the processor cause the processor to perform the steps of:
   sending license terms and payment information to the first user at the first client device;
   receiving assent to the license terms and payment from the first user at the first client device;
   creating a license record corresponding to said first work of authorship and including a link to said first work of authorship;
   providing, to the first user at the first client device, data including a link to the license record;
   receiving, from a second user at a second client device, a request for the license record, via said link, from within a second work of authorship that includes said first work of authorship;
   sending, in response to the request, the license record corresponding to the first work of authorship.

2. The server of claim 1, wherein said server acts as a catalog of Internet-available works of authorship, maintaining a list of said works of authorship and license terms for each work of authorship.

3. The server of claim 1, further performing the steps of: responding to an Email address received from the first client computer by sending an Email, having a message displaying license and indemnification terms, to said address.

4. The server of claim 3, wherein the Email includes a button which a user may click to automatically accept the final license and payment terms presented.

5. The server of claim 1, wherein the work of authorship is sent in portable document file (PDF) format form.

6. The server of claim 1, wherein the license record includes a display of said license, an indication of its current validity, and allows the user to initiate a new license to use the work.

* * * * *